(12) United States Patent  
Tsuboi

(10) Patent No.: US 9,065,926 B2  
(45) Date of Patent: Jun. 23, 2015

(54) PORTABLE ELECTRONIC DEVICE

(75) Inventor: Kazuhiro Tsuboi, Kanagawa (JP)

(73) Assignee: KYOCERA CORPORATION, Kyoto (JP)

( * ) Notice: Subject to any disclaimer, the term of this patent is extended or adjusted under 35 U.S.C. 154(b) by 189 days.

(21) Appl. No.: 13/119,097

(22) PCT Filed: Sep. 16, 2009

(86) PCT No.: PCT/JP2009/066185
§ 371 (c)(1),
(2), (4) Date: Mar. 15, 2011

(87) PCT Pub. No.: WO2010/032760
PCT Pub. Date: Mar. 25, 2010

(65) Prior Publication Data
US 2011/0171999 A1    Jul. 14, 2011

(30) Foreign Application Priority Data
Sep. 17, 2008 (JP) ................. 2008-237284

(51) Int. Cl.
*H04M 1/725* (2006.01)
*G06F 3/023* (2006.01)

(52) U.S. Cl.
CPC ......... *H04M 1/72552* (2013.01); *G06F 3/0233* (2013.01)

(58) Field of Classification Search
USPC ................. 345/156–179; 715/705; 455/564
See application file for complete search history.

(56) References Cited

U.S. PATENT DOCUMENTS

| 5,136,504 A | * | 8/1992 | Fushimoto ...................... 704/10 |
| 6,054,941 A | * | 4/2000 | Chen ............................... 341/28 |
| 6,882,869 B1 | * | 4/2005 | Toebes et al. ................. 455/566 |
| 7,643,822 B2 | * | 1/2010 | Ling et al. ................. 455/414.3 |
| 2002/0032739 A1 | | 3/2002 | Iida |
| 2002/0142807 A1 | * | 10/2002 | Cho ............................... 455/564 |
| 2004/0021696 A1 | * | 2/2004 | Molgaard ..................... 345/810 |

(Continued)

FOREIGN PATENT DOCUMENTS

| CN | 1460333 A | 12/2003 |
| JP | 11-143862 A | 5/1999 |
| JP | 2001-344175 A | 12/2001 |

(Continued)

OTHER PUBLICATIONS

International Search Report for PCT/JP2009/066185.

(Continued)

*Primary Examiner* — Sahlu Okebato
(74) *Attorney, Agent, or Firm* — Hoffman & Baron, LLP

(57) ABSTRACT

Provided is a portable electronic device capable of promptly inputting a character string from the initial screen to create text and capable of launching an e-mail with the text as a message. A control unit executes conversion processing for a first type character if a second key is depressed when controlling so as to display the first type character and a second type character on an LCD display unit, then determines whether or not the text created by the conversion processing is in conformity with the format defined by the application if a third key is depressed and a predetermined application is selected, and adjusts the created text so that the created text is in conformity with the format when determining that the created text is not in conformity with the format.

8 Claims, 9 Drawing Sheets

(56) References Cited

U.S. PATENT DOCUMENTS

2008/0126075 A1* 5/2008 Thorn .............................. 704/3
2009/0219859 A1* 9/2009 Fukushima .................. 370/328

FOREIGN PATENT DOCUMENTS

| | | |
|---|---|---|
| JP | 2003-174405 A | 6/2003 |
| JP | 2006-319525 A | 11/2006 |
| JP | 2006-331429 A | 12/2006 |
| JP | 2007-200243 A | 8/2007 |

OTHER PUBLICATIONS

Notice of Reasons for Rejection issued to JP Application No. 2010-529775, mailed Nov. 13, 2012.

Office Action issued to CN Application No. 200980134212.6, mailed Jul. 18, 2013.

* cited by examiner

| POSITION INFORMATION OF KEY | KEY ASSIGNMENT |
|---|---|
| ⋮ | ⋮ |
| X2, Y1 | 1 |
| X2, Y2 | 2 |
| X2, Y3 | 3 |
| X3, Y1 | 4 |
| X3, Y2 | 5 |
| X3, Y3 | 6 |
| ⋮ | ⋮ |

| POSITION INFORMATION OF KEY | NUMBER OF TIMES CONSECUTIVELY DEPRESSED | KEY ASSIGNMENT |
|---|---|---|
| ⋮ | | ⋮ |
| X2, Y1 | 1 | あ |
| | 2 | い |
| | 3 | う |
| | 4 | え |
| | 5 | お |
| | | ⋮ |

| POSITION INFORMATION OF KEY | KEY ASSIGNMENT |
|---|---|
| ⋮ | ⋮ |
| X2, Y1 | 1ch |
| X2, Y2 | 2ch |
| X2, Y3 | 3ch |
| X3, Y1 | 4ch |
| X3, Y2 | 5ch |
| X3, Y3 | 6ch |
| ⋮ | ⋮ |

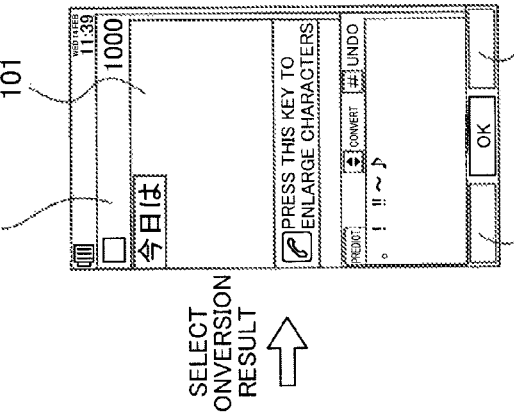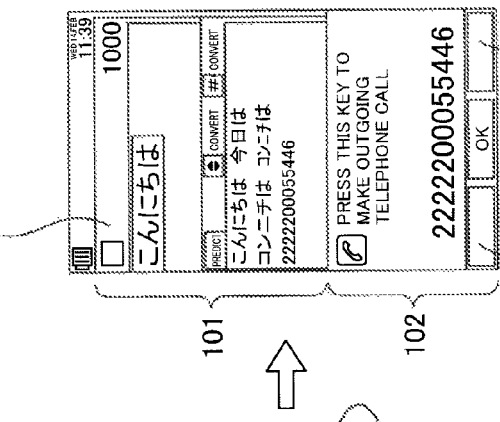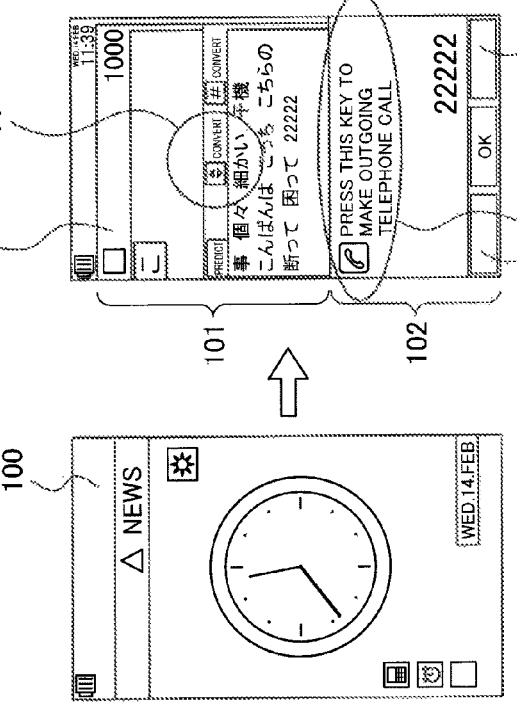

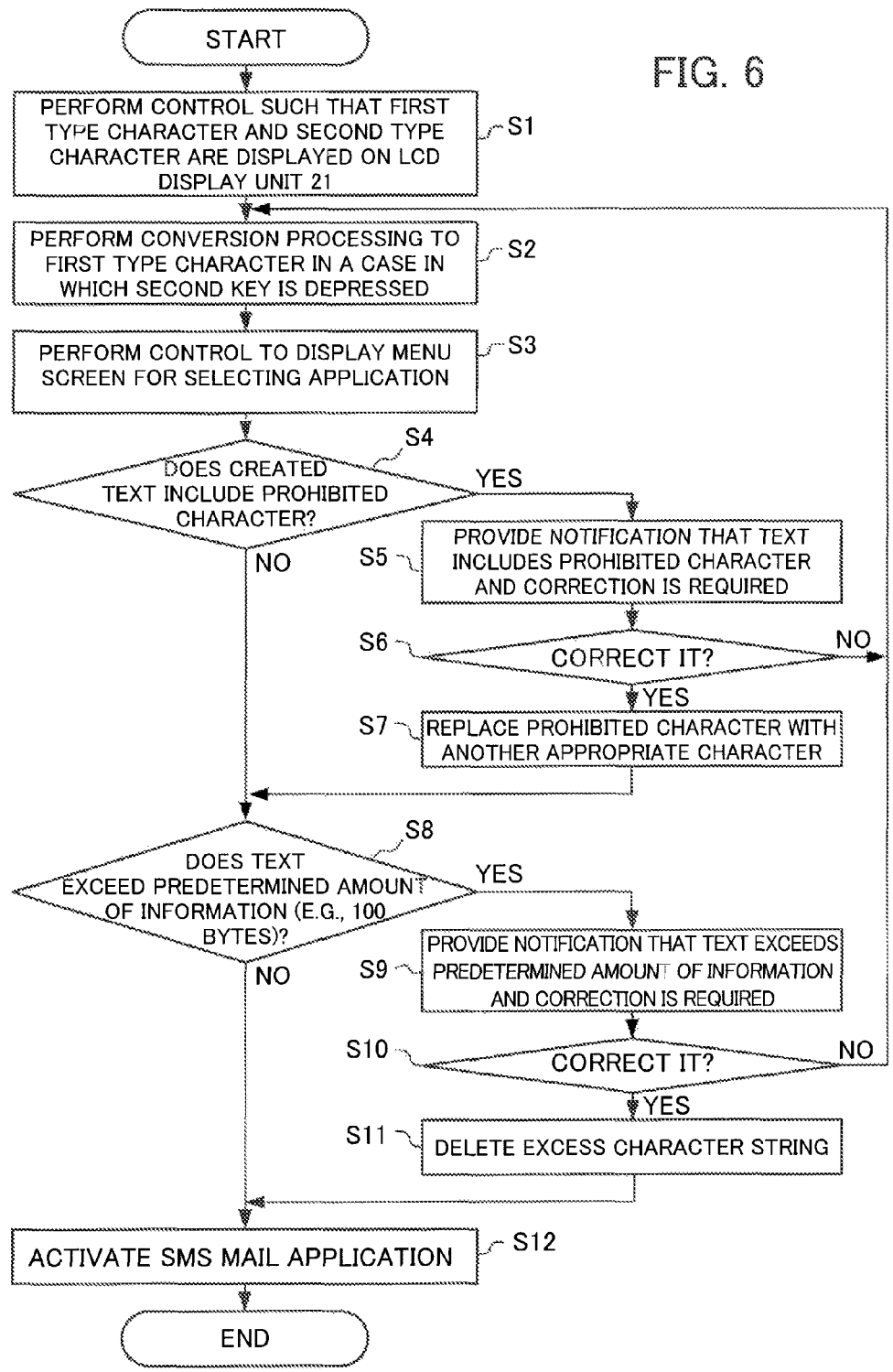

PORTABLE ELECTRONIC DEVICE

CROSS-REFERENCE TO RELATED APPLICATIONS

This application is the National Stage of International Application No. PCT/JP2009/066185, filed Sep. 16, 2009, which claims the benefit of Japanese Application No. 2008-237284, filed Sep. 17, 2008, the entire contents of all of which are incorporated by reference herein.

FIELD OF THE INVENTION

The present invention relates to a portable electronic device having an operation unit, and particularly relates to a portable electronic device in which plural types of characters are assigned to an identical key.

BACKGROUND OF THE INVENTION

A portable electronic device includes: a display unit that displays a variety of information; and an operation unit that is configured with a plurality of keys.

Here, in a portable electronic device such as a cellular telephone device, an initial screen is displayed on a display unit while waiting for an incoming call or while waiting for activation of other applications. When an operation key assigned with a numeric character is depressed in this initial state, a numeric character corresponding to the operation key thus depressed is displayed on the display unit. In addition, in the cellular telephone device, for example, in a case in which an off-hook key is depressed in a state where numeric characters are displayed on the display unit, processing of an outgoing telephone call is performed based on the numeric characters that have been input, and in a case in which a key for activating a calculator (desk calculator) is depressed, a calculator application is activated with the numeric characters that have been input as an initial numeric value.

Moreover, a technique is proposed for a portable electronic device (for example, see Patent Document 1), in which, when a key operation is performed from an initial screen, a character corresponding to the key operation is displayed on a display unit, and when a predetermined operation (operation of depressing a key for displaying a list of applications) is performed, the list of applications corresponding to a displayed character string is displayed, and one application is selected from the list to activate the application.

Patent Document 1: Japanese Unexamined Patent Application, Publication No. 2007-200243

SUMMARY OF THE INVENTION

Problems to be Solved by the Invention

Incidentally, in the initial screen state, in a case in which a key assigned with a numeric character and non-numeric character is depressed by a user, at an initial stage of such a key operation, it is not possible to determine which type of character is intended by the user thus operating. As in the case of the technique of Patent Document 1, if priority is given to an input of non-numeric character, an input of a numeric character will be ignored; whereas, if priority is given to an input of a numeric character, an input of non-numeric character will be ignored, and there is a possibility that the user's intention may not be reflected.

An object of the present invention is to provide a user-friendly portable electronic device that reflects the above-mentioned intentions of the user.

Means for Solving the Problems

In order to solve the aforementioned problems, a portable electronic device according to the present invention is characterized by including: a display unit; a key operation unit; and a control unit that performs control of the display unit and the key operation unit, in which the key operation unit is configured to include: first keys composed of a plurality of keys that are assigned with a first type character and a second type character; a second key to which the first type character and the second type character are not assigned, and to which a single or plurality of function(s) are assigned; and a third key to which the first type character and the second type character are not assigned, and to which a function different from the function of the second key is assigned; in a case in which any one of the first keys is depressed in a state where an initial screen is displayed on the display unit, the control unit performs control such that the first type character assigned to the key thus depressed and the second type character assigned to the key thus depressed are displayed on the display unit; and in a case in which the second key is depressed while the first type character and the second type character are displayed on the display unit, the control unit performs first processing on the first type character; in a case in which the third key is subsequently operated to select a predetermined application, the control unit determines whether a character string created according to the first processing conforms to restrictions defined by the application; and in a case in which the character string is determined to not conform to the restrictions, the control unit performs second predetermined processing.

Moreover, in the portable electronic device, it is preferable that, in a case in which the third key is operated to select a predetermined application in the first processing on the first type character, the control unit determines whether the character string created according to the first processing includes a prohibited character defined by the application, and in a case in which the character string is determined to include the prohibited character, the control unit converts the prohibited character into another character that fits the restrictions, as the second predetermined processing.

In addition, in the portable electronic device, it is preferable that, in a case in which the third key is operated to select a predetermined application in the first processing on the first type character, the control unit determines whether the character string created according to the first processing exceeds an amount of information defined by the application, and in a case in which the character string is determined to exceed the amount of information, the control unit deletes characters corresponding to an excess amount of information, as the second predetermined processing.

Furthermore, in the portable electronic device, it is preferable that the predetermined application is an application that identifies another party of a transmission by way of a telephone number, and transmits mail using a message with a predetermined number of character.

In order to solve the aforementioned problems, a portable electronic device according to the present invention is characterized by including: a display unit; a key operation unit; and a control unit that performs control of the display unit and the key operation unit, in which the key operation unit is configured to include: first keys composed of a plurality of keys that are assigned with a first type character and a second type character; a second key to which the first type character and the second type character are not assigned, and to which a single or plurality of function(s) are assigned; and a third key to which the first type character and the second type character are not assigned, and to which a function different from the function of the second key is assigned; in a case in which any one of the first keys is depressed in a state where an initial screen is displayed on the display unit, the control unit performs control such that the first type character and the second type character assigned to the key thus depressed are displayed on the display unit; in a case in which the second key is depressed while the first type character and the second type character are displayed on the display unit, the control unit performs predetermined processing on the first type character; in a case in which the third key is subsequently operated to select a predetermined application, the control unit determines whether a character string created according to the processing conforms to restrictions defined by the application; in a case in which the character string is determined to not conform to the restrictions, the control unit determines whether the character string created according to the processing conforms to restrictions of an another different from the application selected; and in a case in which the another application is determined to conform to restrictions, the control unit performs control such that selection of whether to select the another application in place of the predetermined application is allowed, or performs control such that the another application is activated.

Moreover, in the portable electronic device, it is preferable that the predetermined application is an application that identifies another party of a transmission by way of a telephone number, and transmits mail using a message with a predetermined number of character.

In order to solve the aforementioned problems, a portable electronic device according to the present invention is characterized by including: a display unit; a key operation unit; and a control unit that performs control of the display unit and the key operation unit, in which the key operation unit is configured to include: first keys composed of a plurality of keys that are assigned with a first type character and a second type character; a second key to which the first type character and the second type character are not assigned, and to which a single or plurality of function(s) are assigned; a third key to which the first type character and the second type character are not assigned, and to which a function being different from the function of the second key is assigned; and a fourth key to which a telephone number can be registered; in a case in which any one of the first keys is depressed in a state where an initial screen is displayed on the display unit, the control unit performs control such that the first type character assigned to the key thus depressed and the second type character assigned to the key thus depressed are displayed on the display unit; in a case in which the second key is depressed while the first type character and the second type character are displayed on the display unit, the control unit performs first processing on the first type character, and in a case in which the third key is subsequently operated to select an application that identifies another party of a transmission by way of a telephone number, and transmits mail with a message of a predetermined number of character, the control unit provides notification of the fourth key to which the telephone number is registered; and in a case in which the fourth key thus notified is operated, the control unit determines whether a character string created according to the first processing conforms to restrictions defined by the application; in a case in which the character string is determined to conform to the restrictions, mail is transmitted to a telephone number registered to the fourth key thus operated; and in a case in which the character string is determined to not conform to the restrictions, second predetermined processing is performed.

In addition, in the portable electronic device, it is preferable that the second predetermined processing is processing to adjust a character string to conform to the restrictions.

Effects of the Invention

According to the present invention, a character string can be immediately created from an initial screen, and it is possible to utilize the created character string in an application.

BRIEF DESCRIPTION OF THE DRAWINGS

FIG. 5 is a diagram illustrating an aspect of a display state that changes from an initial screen to a split screen including a first type character display area and a second type character display area, and subsequently changes to a display state of the first type character display area;

FIG. 6 is a flowchart illustrating a method for adjusting a created text to fit a format of an SMS mail application, and pasting the adjusted text on a message portion of the mail;

DETAILED DESCRIPTION OF THE INVENTION

First Embodiment

Figure 1:
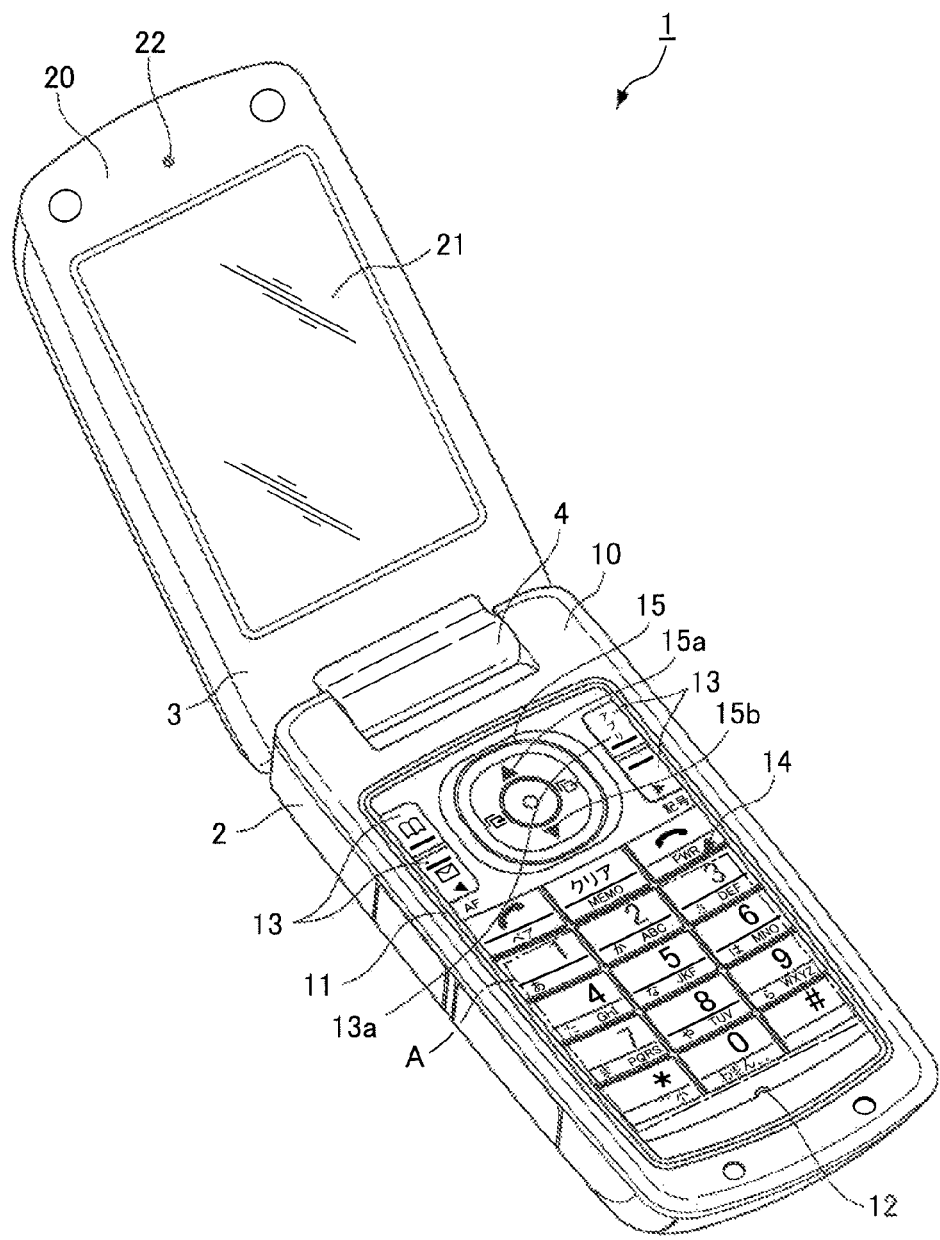
FIG. 1 is a perspective view showing an appearance of a cellular telephone device as a first embodiment of the portable electronic device.

A description is provided hereinafter regarding an embodiment of the present invention. FIG. 1 is a perspective view showing an appearance of a cellular telephone device 1 as a first embodiment of a portable electronic device according to the present invention. It should be noted that, although FIG. 1 shows a so-called folder-type cellular telephone device, the cellular telephone device according to the present invention is not particularly limited thereto. For example, the cellular telephone device may be of: a slider type in which one of the bodies slides to one direction in a state in which the bodies are mutually superimposed; a rotating (turning) type in which one of the bodies is rotated around an axis line along the direction of superimposing the bodies; and a type (straight type) in which an operation unit and a display unit are disposed in one body without having a connecting portion.

The cellular telephone device 1 is configured to include an operation unit side body 2 and a display unit side body 3. The operation unit side body 2 is configured to include, on a front face portion 10 thereof, an operation unit 11 and a microphone 12 to which sound produced by a user of the cellular telephone device 1 during a phone call is input. The operation unit 11 is configured with: function setting operation keys 13 for operating various functions such as for various settings, a telephone number directory function and a mail function; input operation keys 14 for inputting the digits of a telephone number and characters for mail, etc.; and a selection operation key 15 for performing selection of the various operations, scrolling, etc.

Moreover, the display unit side body 3 is configured to include, on a front face portion 20, an LCD (Liquid Crystal Display) display unit 21 for displaying a variety of information, and a speaker 22 for outputting sound of the other party of the conversation.

In addition, an upper end portion of the operation unit side body 2 and a lower end portion of the display unit side body 3 are connected via a hinge mechanism 4. Furthermore, the cellular telephone device 1 can be in a state where the operation unit side body 2 and the display unit side body 3 are apart from each other (opened state), and in a state where the operation unit side body 2 and the display unit side body 3 are contacting each other (folded state), as the operation unit side body 2 and the display unit side body 3, connected via the hinge mechanism 4, pivot with respect to each other.

Figure 2:
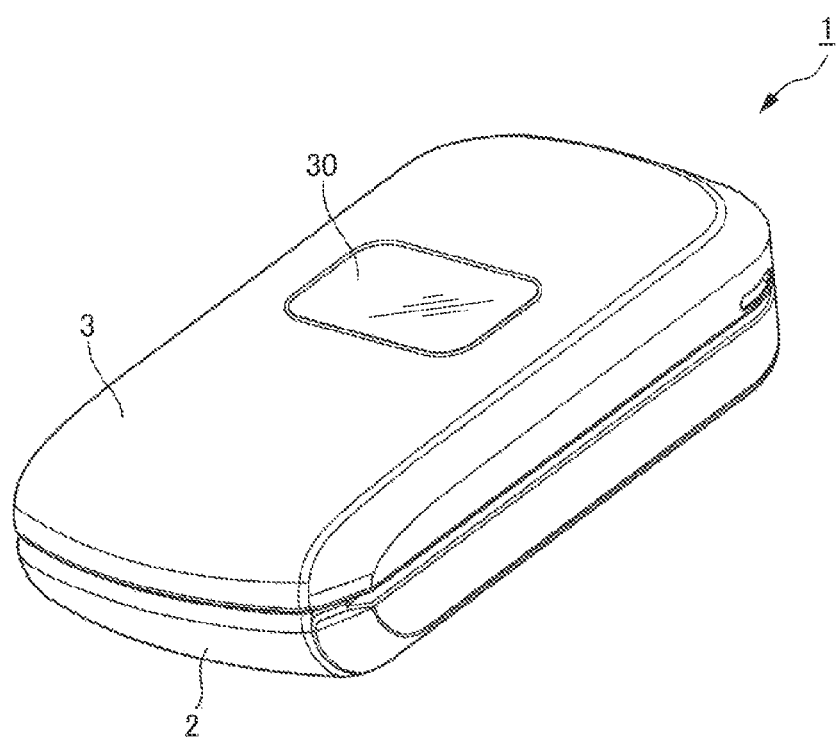
FIG. 2 is a perspective view showing a state in which the cellular telephone device is folded.

Moreover, FIG. 2 is a perspective view showing a state in which the cellular telephone device 1 is folded. The operation unit side body 2 includes, on its outer planar portion, a sub LCD display unit 30 that displays a clock, incoming notice of mail, etc.

Figure 3:
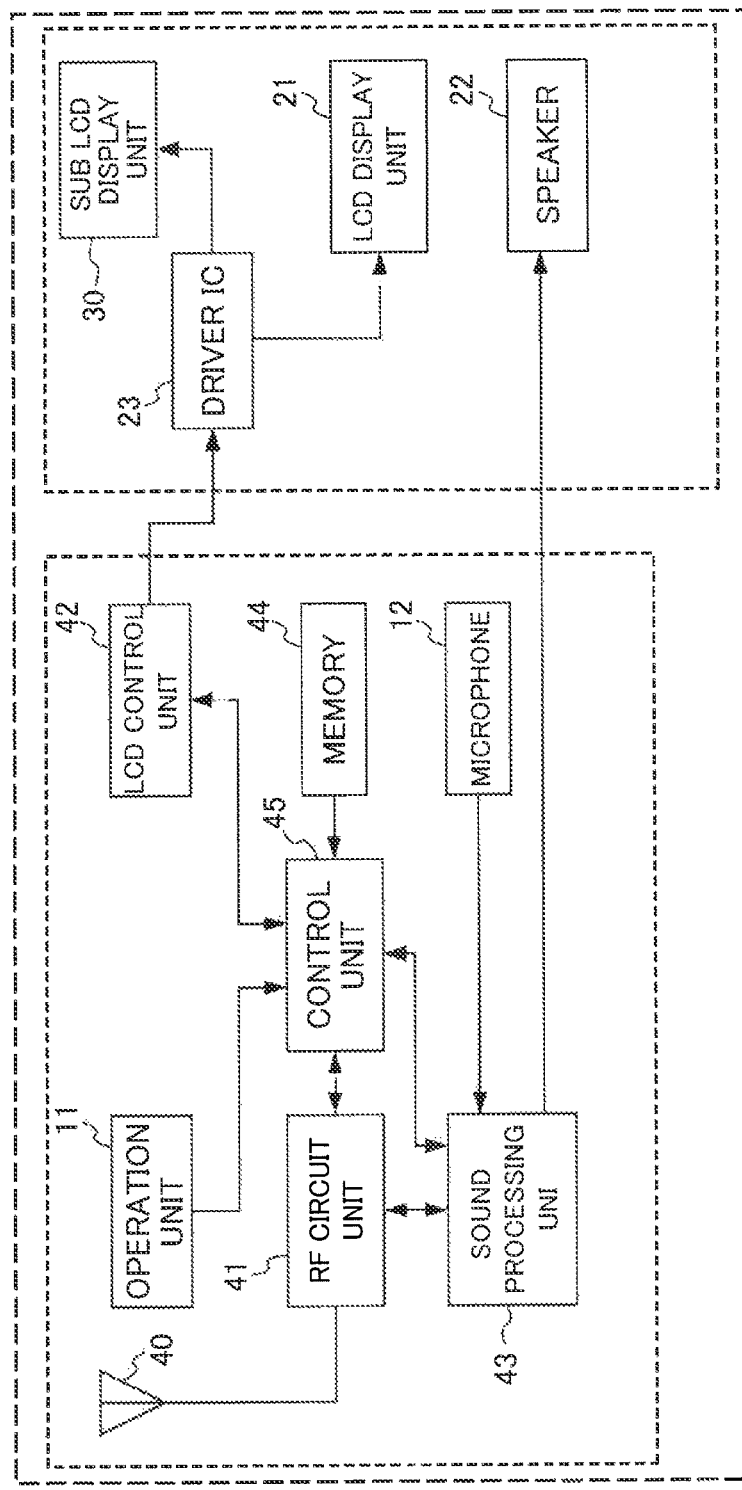
FIG. 3 is a functional block diagram showing functions of the cellular telephone device as the first embodiment of the portable electronic device.

FIG. 3 is a functional block diagram showing functions of the cellular telephone device 1. In the cellular telephone device 1, as shown in FIG. 3, the operation unit side body 2 includes the operation unit (key operation unit) 11, the microphone 12, a main antenna 40, an RF circuit unit 41, an LCD control unit 42, a sound processing unit 43, memory 44, and a control unit 45; and the display unit side body 3 includes the LCD display unit (display unit) 21, the speaker 22, a driver IC 23, and a sub LCD display unit 30.

The main antenna 40 communicates with a base station, etc. via a first usable frequency band (for example, 800 MHz), and is configured as a dual band compatible antenna that can be compatible with a second usable frequency band (for example, 1.5 GHz) for GPS communication. It should be noted that, although 800 MHz is set as the first usable frequency band in the present embodiment, other frequency bands can also be used. In addition, the main antenna 40 may communicate with an external device via the first usable frequency band, and another antenna that is compatible with the second usable frequency band for GPS communication may be separately provided.

The RF circuit unit 41 performs demodulation processing of a signal received via the main antenna 40, and transmits the processed signal to the control unit 45. The RF circuit unit 41 performs modulation processing of the signal transmitted from the control unit 45, and transmits the signal to external devices (base stations) via the main antenna 40. Furthermore, on the other hand, the RF circuit unit 41 notifies the control unit 45 of the intensity of a signal received via the main antenna 40.

The LCD control unit 42 performs predetermined image processing in accordance with control by the control unit 45, and outputs the processed image data to the driver IC 23. The driver IC 23 stores the image data, which is transmitted from the LCD control unit 42, in frame memory so as to be output to the LCD display unit 21 or the sub LCD display unit 30 at predetermined timing.

The sound processing unit 43 performs predetermined sound processing in accordance with control by the control unit 45 for a signal transmitted from the RF circuit unit 41, and outputs the processed signal to the speaker 22. The speaker 22 externally outputs the signal that is transmitted from the sound processing unit 43.

Moreover, the sound processing unit 43 processes a signal, which is input from the microphone 12, in accordance with control by the control unit 45, and outputs the processed signal to the RF circuit unit 41. The RF circuit unit 41 performs predetermined processing on the signal transmitted from the sound processing unit 43, and outputs the processed signal to the main antenna 40.

The memory 44 includes, for example, working memory, and is utilized for arithmetic processing by the control unit 45. In addition, the memory 44 stores a plurality of applications as well as various tables, etc. required by the applications. Furthermore, the memory 44 may also serve as detachable external memory.

The control unit 45 controls the entirety of the cellular telephone device 1, and is configured to employ a central processing unit (CPU), etc. Here, a description is provided for control operations of the control unit 45 depending on key operations via the operation unit 11. The control unit 45 changes the characters and functions to be assigned to each key (the function setting operation keys 13, the input operation keys 14 and the selection key 15) configuring the operation unit 11, essentially in accordance with an application that is currently activated.

Figures 4A, 4B, 4C, 4D:
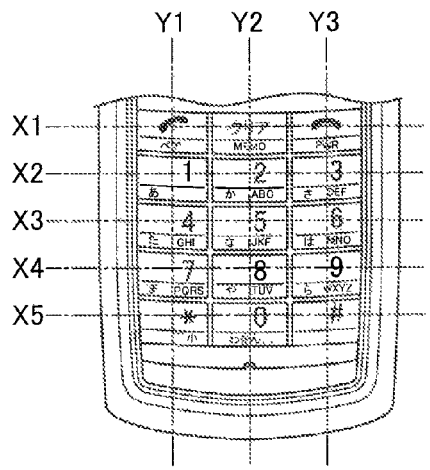
FIG. 4 is a diagram illustrating key assignment.

More specifically, when any key is depressed, the operation unit 11 transmits position information of the key to the control unit 45 (for example, as shown in FIG. 4 (*a*), in a case of depressing a key in the second line and the left row among the input operation keys 14 (a key with "1" and "a" printed on its surface; "a" is a Japanese hiragana character pronounced as "a" in the Hepburn system; hereinafter simply referred to as "a"), position information of (X2, Y1) is transmitted). The control unit 45 accesses the memory 44, refers to a key assignment table corresponding to an application that is currently activated, and performs processing of a character and a function assigned thereto, based on the position information that has been transmitted from the operation unit 11. For example, as shown in FIGS. 4 (*b*) to 4 (*d*), the memory 44 stores a plurality of key assignment tables. It should be noted that FIG. 4 (*b*) is a table that is utilized when an outgoing telephone call is made; FIG. 4 (*c*) is a table that is utilized in a memo pad application and a mail application; and FIG. 4 (*d*) is a table that is utilized when changing a channel in a television tuner application.

It should be noted that execution of processing a character means that, for example, in a case in which the currently activated application is a memo pad, then "1" or "a" is displayed on the LCD display unit 21. Moreover, execution of processing a function means that, for example, in a case in which the currently activated application is a television tuner, the display channel is set to channel 1.

In addition, the memory 44 stores a plurality of key assignment tables, and depending on the application, the control unit 45 switches a key assignment table to be referred to, refers to a predetermined key assignment table based on position information of a key that has been transmitted from the operation unit 11, and performs predetermined processing.

The cellular telephone device 1 with such a configuration has a function, in which, in a case in which a key operation is performed in the standby state for communication, a plurality of characters (for example, a numeric character and non-numeric character) assigned to the key are displayed, for example, on separate screen areas in parallel, respectively, and in a case in which a predetermined key operation is performed, a screen displaying one of the characters is activated. Furthermore, the cellular telephone device 1 has a function, in which, in a state where a plurality of characters are displayed in parallel on separate screen areas, conversion processing of the characters is performed to create a text, and in a case in which an SMS (Short Message Service) mail application is selected by a predetermined operation, the text is adjusted to fit the format of the mail application. It should be noted that fitting a format refers to, for example, conforming to restrictions for each application, such as regarding whether a character string exceeds a limited number of character, or whether a prohibited character is included.

Here, operations of the control unit 45 for exercising the aforementioned function are described. The operation unit 11 is configured to include: first keys (for example, keys positioned from the second to fifth lines of the input operation keys 14 indicated by A in FIG. 1); second keys (for example, an upward operation key 15a and a downward operation key 15b of the selection operation key 15 shown in FIG. 1); and third keys (for example, a key 13a included in the function setting operation keys 13 shown in FIG. 1).

The first keys are configured with a plurality of keys, to which the first type characters (for example, hiragana characters such as "a", "i" and "u") and the second type characters (for example, numeric characters such as "1", "2" and "3") are assigned. The second keys are keys to which the first type characters and the second type characters are not assigned, and to which a single or plurality of functions (for example, a function of converting hiragana characters into kanji characters, etc.) are assigned. The third keys are keys to which the first type characters and the second type characters are not assigned, and to which a function (for example, a function of displaying a menu to select an application, etc.) different from the function of the second keys is assigned.

In a state where the LCD display unit 21 is displaying the initial screen 100 that waits for an incoming call (FIG. 5 (*a*)), and in a case in which any one of the first keys is depressed, the control unit 45 performs control such that a first type character assigned to the depressed key and a second type character assigned to the depressed key are displayed on the LCD display unit 21 (FIGS. 5 (*b*) and 5 (*c*)). More specifically, the control unit 45 performs control such that the first type character is displayed on the first type character display area 101, and the second type character is displayed on the second type character display area 102. Moreover, the first type character is a character corresponding to, for example, a hiragana character such as "a", "i" and "u". The second type character is a character corresponding to, for example, a numeric character such as "1", "2" and "3".

In addition, while the control unit 45 is performing control such that the first type character and the second type character are displayed on the LCD display unit 21, and in a case in which the second key is depressed, the control unit 45 performs conversion processing (first processing) (for example, processing to convert hiragana characters into kanji characters) for the first type character (that has been input on the first type character display area 101) (FIG. 5 (*d*)), and subsequently, in a case in which a predetermined application is selected by way of the third key (key 13a) being depressed, the control unit 45 determines whether a text created by the conversion processing conforms to a format defined by the application, and in a case in which the text is determined to not conform to the format, the control unit 45 adjusts the text to fit the format.

Here, a predetermined application refers to, for example, an application that identifies the other party of a transmission by way of a telephone number, and transmits mail using a message with a predetermined number of character (hereinafter referred to as SMS (short message service) mail).

Here, in the example shown in FIG. 5, on the initial screen 100 (FIG. 5 (*a*)), in a case in which the key with "2" and "ka" printed on its surface is consecutively depressed five times, the control unit 45 performs control such that a hiragana character "ko" is displayed on the first type character display area 101 that displays the first type characters, and at the same time, a numeric character string "22222" is displayed on the second type character display area 102 that displays the second type characters (FIG. 5 (*b*)). Next, in a case in which the key with "0" and "wa, o, n" printed on its surface is depressed three times, the key with "5" and "na" printed on its surface is depressed twice, the key with "4" and "ta" printed on its surface is depressed twice, and the key with "6" and "ha" printed on its surface is depressed once, a hiragana character string that reads "ko n ni chi ha" is displayed on the first type character display area 101, and a numeric character string "2222200055446" is displayed on the second type character display area 102 (FIG. 5 (*c*)).

Moreover, in a case in which the upward operation key 15a or the downward operation key 15b of the selection operation key 15 is operated when the display screen is in a state shown in FIG. 5 (*b*), 5 (*c*) or the like, the control unit 45 performs processing to convert the hiragana characters into kanji characters, and the first type character display area 101 is displayed in an enlarged manner on the display screen. In the example shown in FIG. 5 (*d*), the hiragana character string "ko n ni chi ha" is converted into a character string including kanji characters, which is pronounced as "kon-nichiwa" ("Hello" in English). It should be noted that, more specifically, after the conversion into the character string "kon-nichiwa" including kanji characters by way of the upward operation key 15a and/or the downward operation key 15b of the selection operation key 15 being depressed, the character string "kon-nichiwa" including kanji characters is determined as an input character string by way of a character selection operation (for example, by depressing a center key included in the selection operation key 15).

After creating a text as described above, when the third key (key 13a) is depressed, a menu screen is displayed for enabling selection from a plurality of applications. In addition, in a case in which the SMS mail application is selected by way of the upward operation key 15a and/or the downward operation key 15b being depressed, the control unit 45 adjusts a created text to fit the SMS mail format.

In this way, in the cellular telephone device 1, a text can be immediately created in an initial screen state without selecting any application, the text is subsequently adjusted to fit a predetermined format, and the adjusted text is pasted on a message portion of SMS mail; therefore, it is possible to provide a highly convenient method, which is different from conventional methods, as a method of transmitting mail utilizing an SMS mail function.

Furthermore, more specifically, after a text is created in the initial screen, when the third key (key 13a) is depressed, the control unit 45 performs control to display a menu screen that enables selection from a plurality of applications. Subsequently, in a case in which the SMS mail application is selected by way of the upward operation key 15a and/or the downward operation key 15b being depressed, the control unit 45 determines whether a prohibited character (prohibited code) defined by the application is included in a character string related to the first type character, and in a case in which it is determined that a prohibited character is included, the prohibited character is converted into another character.

A prohibited character (prohibited code) is, for example, a character (code) indicating a line feed. Moreover, in a case in which a character (code) indicating a line feed is included in a text before adjustment, the control unit 45 performs displaying on the LCD display unit 21 that, for example, "A character that cannot be input is included. Such a character may not be displayed correctly. OK?", etc. In addition, in a case in which "YES" is selected by way of a selection operation by the user, the control unit 45 converts (replaces) a character indicating a line feed into a character indicating a blank (space), pastes a converted text on a message portion, and transitions to a screen for creating SMS mail. Furthermore, in a case in which "NO" is selected by a selection operation by the user, the control unit 45 does not activate the SMS mail application.

It should be noted that the prohibited character (prohibited code) is not limited to such an example as well as examples described later. Whether or not a character in a character string corresponds to a prohibited character is determined for each application, or is determined based on a standard that is individually defined for each predetermined processing in the application. Moreover, the memory 44 may include a table of prohibited characters, and whether or not a character corresponds to a prohibited character may be determined by referring to the table.

In addition, in a case in which a text before adjustment includes a prohibited character, the control unit 45 may forcibly convert (replace) the prohibited character into another character, paste a converted text on a message portion, and perform transition to a screen for creating SMS mail. Furthermore, after the transition to the screen for creating SMS mail, the user can perform addition, modification, deletion, etc. of the text in accordance with a predetermined format.

With such a configuration, in the cellular telephone device 1, a created text is adjusted to fit the format of the SMS mail application; therefore, a text can be created in the initial screen, and transition to the SMS mail application can be smoothly performed.

Moreover, after a text is created in the initial screen, and when the third key (key 13*a*) is depressed, the control unit 45 performs control to display a menu screen that enables selection from a plurality of applications. Subsequently, in a case in which the SMS mail application is selected by way of the upward operation key 15*a* and/or the downward operation key 15*b* being depressed, the control unit 45 determines whether a character string related to the first type character exceeds an amount of information defined by the application, and when it is determined that the amount of information is exceeded, characters corresponding to the excess amount of information (for example, 100 bytes) are deleted.

In a case in which, for example, texts before adjustment include an amount of information that is equal to or greater than 101 bytes, the control unit 45 performs displaying on the LCD display unit 21 that "The allowable input number of character is exceeded. Delete the excess character string?", etc. In a case in which "YES" is selected by a selection operation by the user, the control unit 45 pastes, on a message portion, from a character at a head of a determined characters string to a character corresponding to the 100th byte (in a case in which the 99th byte is a two-byte code, the character at the 99th byte from the head), and transitions to the screen for creating SMS mail. In addition, in a case in which "NO" is selected by a selection operation by the user, the control unit 45 does not activate the SMS mail application. In this case, in place of activating the SMS mail application, the control unit 45 may be allowed to activate an e-mail application or a memo pad application, of which the restrictions are less strict for a number of character and prohibited characters, or may be allowed to select whether such an applications is activated. In other words, in a case in which an input text (character string) before adjustment conforms to restrictions with regard to the e-mail application or the memo pad application, the control unit 45 may activate such an application, or may select whether such an application is activated. Furthermore, in a case in which a text before adjustment includes an amount of information that is equal to or greater than 101 bytes, the control unit 45 may forcibly delete characters of the 101st byte and later, paste a text after such deletion on a message portion, and perform transition to the screen for creating SMS mail. Moreover, after the transition to the screen for creating SMS mail, the user can perform addition, modification, deletion, etc. of the text in accordance with a predetermined format.

With such a configuration, in the cellular telephone device 1, a created text is adjusted to fit the format of the SMS mail application; therefore, a text can be created in the initial screen, and transition to the SMS mail application can be smoothly performed.

Here, a method is described in detail with reference to the flowchart shown in FIG. 6, in which a text is immediately created in a state of the initial screen without selecting an application, after which the text is adjusted to fit the format of the SMS mail application, and the text thus adjusted is pasted on a message portion of the mail.

In Step S1, in a case in which any one of the first keys is depressed in the initial screen 100, the control unit 45 performs control such that a first type character assigned to the depressed key and a second type character assigned to the depressed key are displayed on the LCD display unit 21.

In Step S2, in a case in which any one of the second keys is depressed, the control unit 45 performs processing (for example, processing to convert hiragana characters into kanji characters) for the first type character (that has been input on the first type character display area 101).

In Step S3, in a case in which the third key (key 13*a*) is depressed, the control unit 45 performs control to display a menu screen for selecting an application. In this processing, in a case in which the SMS mail application is selected by way of the upward operation key 15*a* and/or the downward operation key 15*b* being depressed, the control unit 45 activates the SMS mail application.

In Step S4, the control unit 45 determines whether the text created in the processing of Step S2 includes a prohibited character. In a case in which it is determined that a prohibited character is included (YES), the processing advances to Step S5, and in a case in which it is determined that a prohibited character is not included (NO), the processing advances to Step S8.

In Step S5, the control unit 45 provides notification to the user that the created text includes a prohibited character(s), and thus needs to be corrected. The notification is provided, for example, by visually displaying on the LCD display unit 21 that "A character that cannot be input is included. Such a character may not be displayed correctly. OK?", etc. It should be noted that the notification is not limited to visual displaying, and may be performed by way of sound, etc.

In Step S6, the control unit 45 recognizes the response from the user to the notification according to the processing of Step S5. In a case in which the prohibited character is determined to be replaced with another character in accordance with the response from the user (YES), the processing advances to Step S7, and in a case in which the prohibited character is determined not to be replaced with another character in accordance with the response from the user (NO), the processing returns to Step S2.

In Step S7, the control unit 45 substitutes all of the prohibited characters in the text with other appropriate characters. For example, a code (character) indicating a line feed is replaced with a code (character) indicating a single-byte space.

In Step S8, the control unit 45 determines whether the text created in Step S2 exceeds a predetermined amount of information (for example, 100 bytes). In a case in which the text has been determined to exceed 100 bytes (YES), the processing advances to Step S9, and in a case in which the text has been determined to not exceed 100 bytes (NO), the processing advances to Step S12.

In Step S9, the control unit 45 provides notification to the user that the created text exceeds a predetermined amount of information, i.e. the number of characters is excessive and thus correction is required. The notification is provided, for example, by visually displaying on the LCD display unit 21 that "The allowable input number of character is exceeded. Delete the excess character string?", etc. It should be noted that the notification is not limited to visual displaying, and may be performed by way of sound, etc.

In Step S10, the control unit 45 recognizes the response from the user to the notification according to the processing of Step S9. In a case in which the excess character string is determined to be deleted in accordance with the response from the user (YES), the processing advances to Step S11, and in a case in which the excess character string is determined not to be deleted in accordance with the response from the user (NO), the processing returns to Step S2.

In Step S11, the control unit 45 deletes the excess character string.

In Step S12, the control unit 45 activates the SMS mail application, performs transition to a screen for creating mail, and pastes a text adjusted as necessary on a message portion.

It should be noted that, in the processing of Step S8, in a case in which the created text exceeds a predetermined amount of information, the control unit 45 may be configured to activate an ordinary mail application instead of the SMS mail application, perform transition to a screen for creating mail, and paste the created text on a message portion.

With such a configuration, in the cellular telephone device 1, a text can be immediately created in an initial screen state without selecting any application, the text is subsequently adjusted to fit a predetermined format, and the adjusted text is pasted on a message portion of SMS mail; therefore, it is possible to provide a highly convenient method, which is different from conventional methods, as a method of transmitting mail utilizing an SMS mail function.

It should be noted that the method of key assignment shown in FIG. 4 is an example, and the method is not limited to the present method.

Moreover, the embodiment as described above is for a case in which a predetermined application is the SMS mail application. However, the present invention is not limited thereto, and the predetermined application may be another application other than the SMS mail application.

As an example, the predetermined application may be an application that requires an input of a password immediately after activation. In this case, a character string serving as a password (for example, a character string composed of single-byte numeric characters) will be input by operating the first keys and the second keys. In a case in which an application that requires an input of a password immediately after activation is selected by operating the third key, the control unit 45 determines whether an input character string includes a prohibited character (for example, a double-byte numeric character) that is prohibited to be used as a password. In addition, in a case in which the control unit 45 determines that the input character is a prohibited character, or the input character string includes a prohibited character, the control unit 45 performs, as second predetermined processing, caution display (or an alarm sound output) indicating that a prohibited character is included.

Furthermore, as another example, a predetermined application may be a web browser provided with a function capable of searching for a predetermined character string by utilizing the Internet connected via a communication unit. In this case, a character string to be searched for is input by operating the first keys and the second keys. In a case in which the web browser is selected by operating the third key, the control unit 45 determines whether the input character string includes a character string that is prohibited to be searched for (for example, a character such as "narcotic drug" or "stimulant drug"). Moreover, in a case in which the control unit 45 determines that the input character string is a prohibited character string, or that the input character string includes a prohibited character string, the control unit 45 does not perform the search for the input character string, as the second predetermined processing.

Second Embodiment

Figure 7:
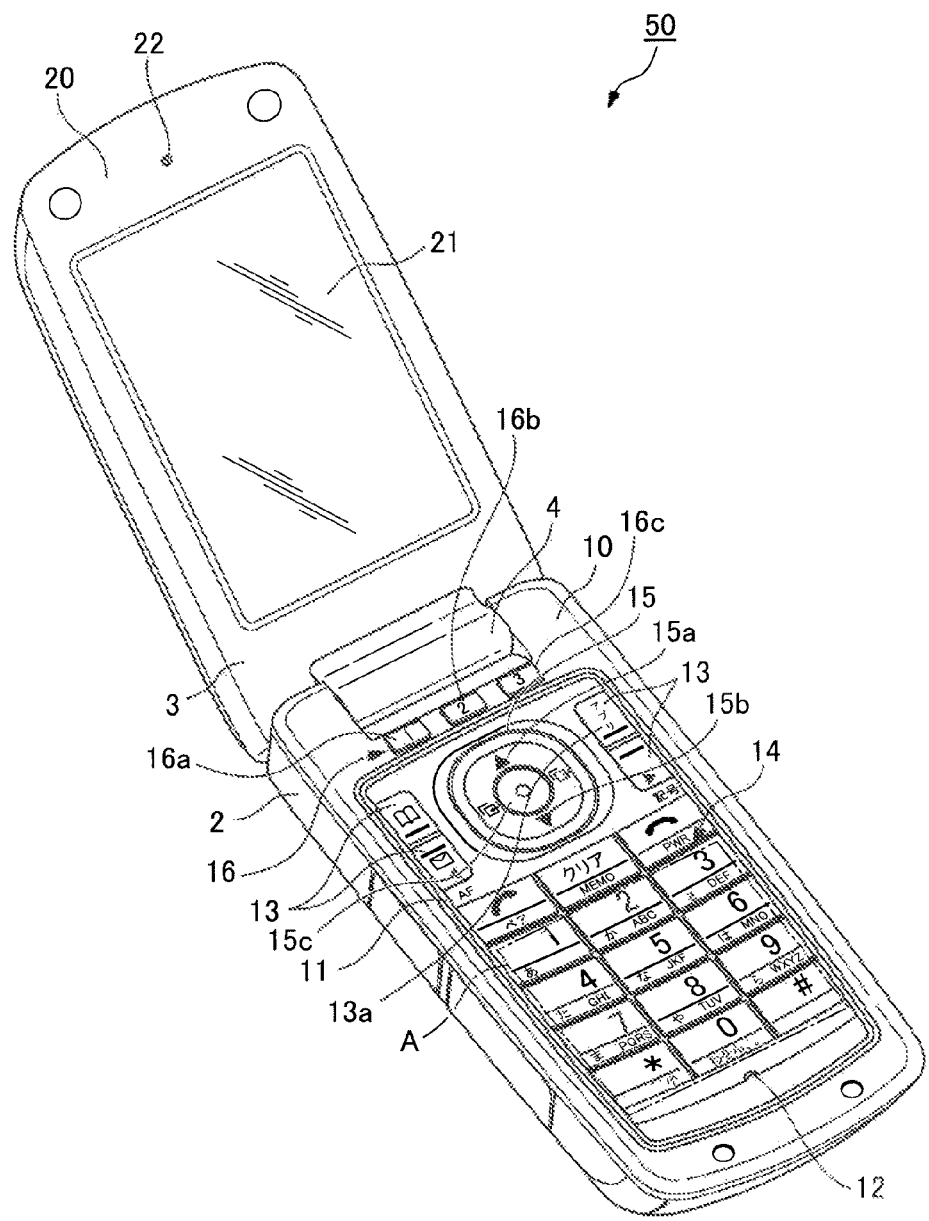
FIG. 7 is a perspective view showing an appearance of the cellular telephone device as a second embodiment of the portable electronic device.
Figure 8:
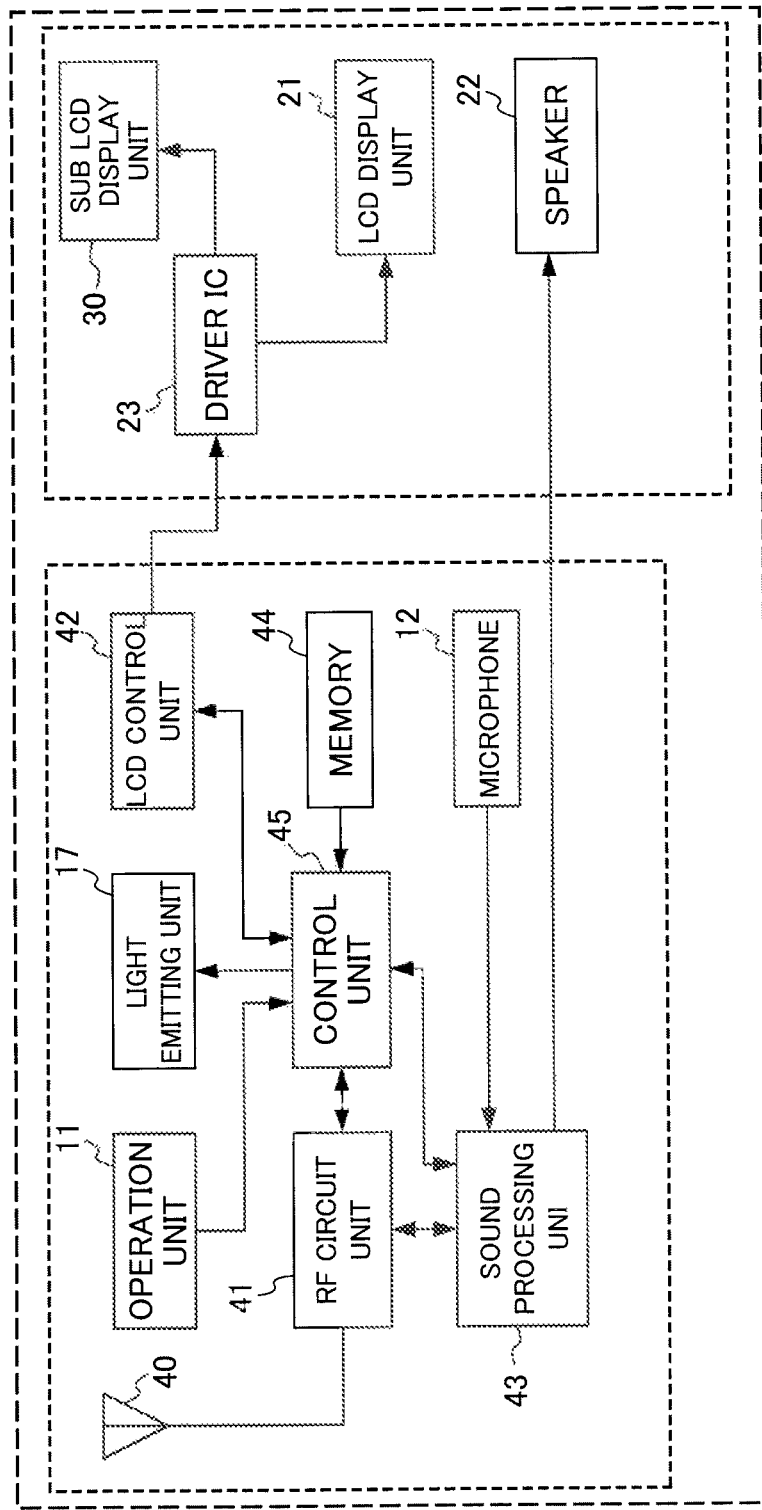
FIG. 8 is a functional block diagram showing functions of the cellular telephone device as the second embodiment of the portable electronic device.

FIG. 7 is a perspective view showing an appearance of a cellular telephone device 50 as a second embodiment of the portable electronic device according to the present invention. FIG. 8 is a functional block diagram showing functions of the cellular telephone device 50 as the second embodiment of the portable electronic device.

As shown in FIG. 7, the cellular telephone device 50 is configured to include the operation unit side body 2, the display unit side body 3, and the hinge mechanism 4 that connects the display unit side body 3 and the operation unit side body 2.

Fourth keys (fingertip keys 16) configuring the operation unit 11 are disposed on an upper side of the operation unit side body 2. In the case shown in FIG. 7, a plurality of fingertip keys 16 (a first fingertip key 16a, a second fingertip key 16b, and a third fingertip key 16c) are provided. It should be noted that the number of the fingertip keys 16 is not limited to three as shown in FIG. 7, and may be one or more than three.

A telephone number can be registered to each of the first fingertip key 16a, the second fingertip key 16b and the third fingertip key 16c. In other words, as a pair function, at least one among a telephone number and an e-mail address can be registered to each of the first fingertip key 16a, the second fingertip key 16b and the third fingertip key 16c. By way of any one of the first to third fingertip keys 16a to 16c being depressed, SMS mail including a message of a predetermined number of character can be transmitted to a telephone number registered to the depressed fingertip key 16, or e-mail can be transmitted to an e-mail address registered to the depressed fingertip key 16. It should be noted that, in the example described below, only a telephone number is registered to each of the first fingertip key 16a and the third fingertip key 16c, and only an e-mail address is registered to the second fingertip key 16b; however, the present invention is not limited thereto.

Regarding the first fingertip key 16a, the second fingertip key 16b and the third fingertip key 16c, in a case of selecting an application that identifies the other party of a transmission by way of a telephone number, and transmits mail (SMS mail) with a message of a predetermined number of character, notification is provided of the key to which the telephone number is registered. A light emitting unit 17 is disposed in back of each of the first fingertip key 16a, the second fingertip key 16b and the third fingertip key 16c (inside the operation unit side body 2) (see FIG. 8). The light emitting unit 17 is configured with, for example, a light emitting diode. The light emitting unit 17 is controlled by the control unit 45 so as to blink or illuminate. By way of the light emitting unit 17 blinking or illuminating, the fingertip key 16 with the light emitting unit 17 disposed thereto also blinks or illuminates.

It should be noted that the configuration of the function setting operation keys 13, the input operation keys 14 and the selection operation key 15, which configure the operation unit 11, is the same as the configuration described in the first embodiment, and thus a description thereof is omitted.

Moreover, the configurations of the microphone 12, the main antenna 40, the RF circuit unit 41, the LCD control unit 42, the sound processing unit 43, the memory 44, the LCD display unit 21, the speaker 22, the driver IC 23, and the sub LCD display unit 30 are the same as the configurations described in the first embodiment, and thus descriptions thereof are omitted.

In a state where the LCD display unit 21 is displaying the initial screen 100 that waits for an incoming call, and in a case in which any one of the first keys is depressed, the control unit 45 performs control such that a first type character assigned to the depressed key and a second type character assigned to the depressed key are displayed on the LCD display unit 21.

In addition, in a case in which any one of the second keys is depressed while the first type character and the second type character are displayed on the LCD display unit 21, the control unit 45 performs the first processing (for example, processing to convert hiragana characters into kanji characters) for the first type character, and in a case of selecting an application that identifies the other party of a transmission by way of a telephone number, and transmits mail (SMS mail) with a message of a predetermined number of character, the control unit 45 performs control such that notification is provided of the fourth key (the fingertip key 16) to which the telephone number is registered. It should be noted that, in a case in which notification is provided of the fourth key, the control unit 45 controls the light emitting unit 17 to blink or illuminate, thereby causing the fourth key (fingertip key 16) to blink or illuminate.

Furthermore, in a case in which the fourth key (fingertip key 16) thus notified is operated, the control unit 45 determines whether a character string created in the first processing conforms to the restrictions defined by the application, and the control unit 45 performs control such that, when the character string is determined to conform to the restrictions, mail (SMS mail) is transmitted to the telephone number registered to the fourth key (fingertip key 16) thus operated, and when the character string is determined to not conform to the restrictions, the second predetermined processing is performed.

Here, as a determination of whether conforming to the restrictions, in a case in which the control unit 45 determines that the character string created in the first processing includes a prohibited character defined by the application, the control unit 45 performs processing to convert the prohibited character into another character that fits the restrictions, as the second predetermined processing.

Moreover, as the determination of whether conforming to the restrictions, in a case in which the control unit 45 determines that the character string created in the first processing exceeds an amount of information defined by the application, the control unit 45 performs processing to delete characters corresponding to the excess amount of information, as the second predetermined processing.

Figure 9:
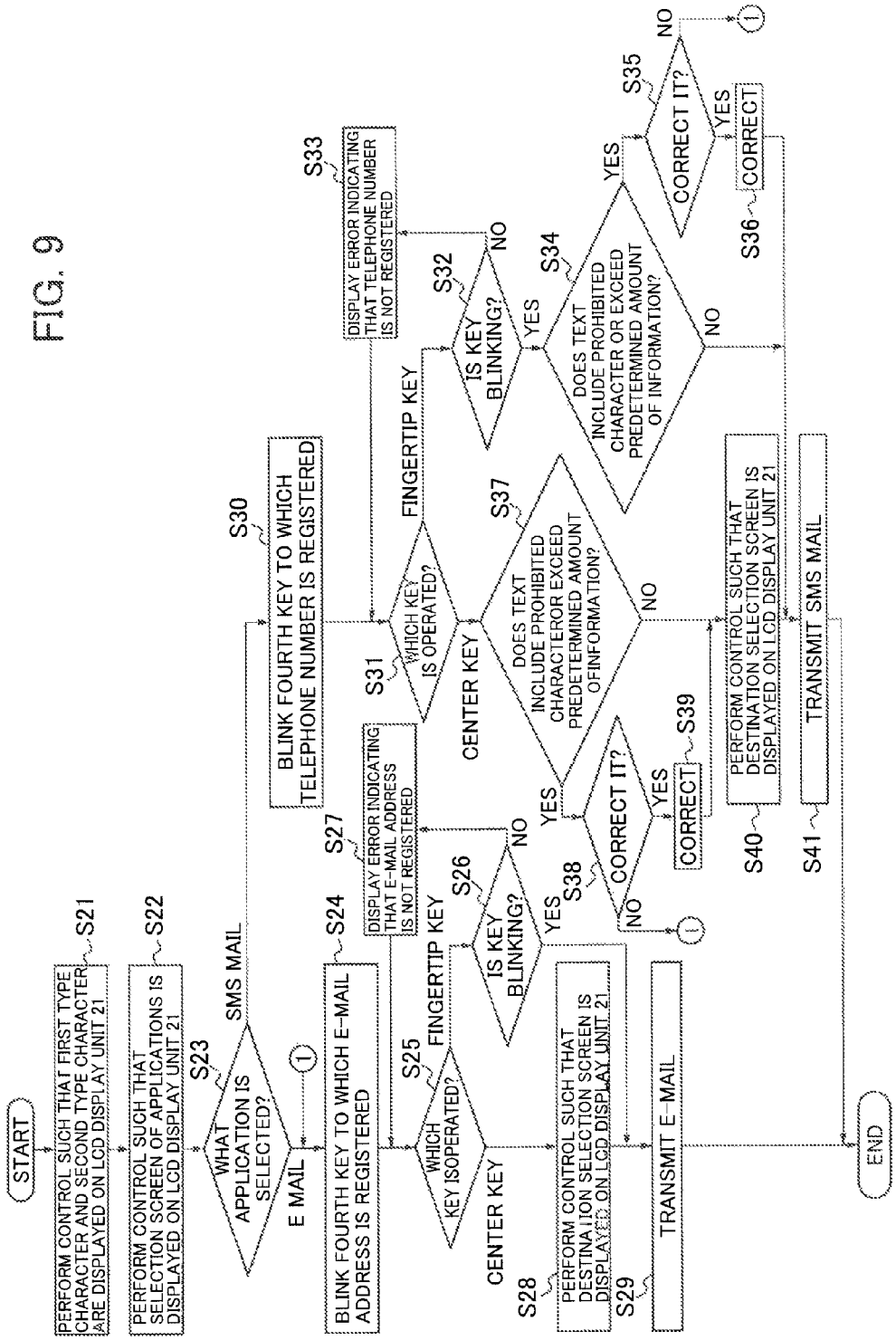
FIG. 9 is a flowchart illustrating operations of the cellular telephone device as the second embodiment of the portable electronic device.

Next, operations of the cellular telephone device 50 according to the second embodiment are described in detail with reference to the flowchart shown in FIG. 9.

In Step S21, in a case in which any one of the first keys is depressed in the initial screen 100, the control unit 45 performs control such that a first type character assigned to the depressed key and a second type character assigned to the depressed key are displayed on the LCD display unit 21.

In Step S22, based on the fact that any one of the second keys is depressed, the control unit 45 performs the first processing (for example, processing to convert hiragana characters into kanji characters) for the first type character that has been input on the first type character display area 101, and in a case in which the third key (key 13*a*) is depressed, the control unit 45 performs control to display a selection screen of applications on the LCD display unit 21.

In Step S23, the control unit 45 determines the selection of an application. In other words, the control unit 45 determines whether "e-mail transmission" is focused or "SMS mail transmission" is focused, in the selection screen displayed on the LCD display unit 21. In a case in which "e-mail transmission" is focused, the processing advances to Step S24. In a case in which "SMS mail transmission" is focused, the processing advances to Step S30.

It should be noted that being focused refers any one of a plurality of applications being highlighted for selecting. By selecting an application that is focused (highlighted) in the LCD display unit 21 (for example, by depressing the center key 15*c* to which a selection function is assigned), the application is activated.

In Step S24, the control unit 45 causes any of the fourth keys (fingertip keys 16) to which an e-mail address is registered to blink. In the present embodiment, an e-mail address is registered only to the second fingertip key 16, and thus the control unit 45 controls the light emitting unit 17 that is disposed correspondingly to the second fingertip key 16*b* to blink, thereby causing the second fingertip key 16*b* to blink (or to be notified). It should be noted that the control unit 45 may control the fingertip keys 16 to illuminate, instead of controlling the fingertip keys 16 to blink.

In Step S25, the control unit 45 determines which key has been operated by the user. In other words, the control unit 45 determines whether the fingertip key 16 has been operated or the center key 15*c* has been operated. In a case in which the fingertip key 16 has been operated, the processing advances to Step S26. In a case in which the center key 15*c* has been operated, the processing advances to Step S28.

In Step S26, the control unit 45 determines whether the fingertip key 16 operated by the user is the second fingertip key 16*b* blinking according to the processing of Step S24. In a case in which the operated key is not the second fingertip key 16*b* (NO), the processing advances to Step S27. In a case in which the operated key is the second fingertip key 16*b* (YES), the processing advances to Step S29.

In Step S27, the control unit 45 performs control such that the LCD display unit 21 displays an error display indicating that an e-mail address is not registered to the fingertip key 16 (the first fingertip key 16*a* or the third fingertip key 16*c*) operated by the user.

In Step S28, the control unit 45 performs control such that a destination selection screen is displayed on the LCD display unit 21 in order to allow the user to select a destination of the e-mail. The destination selection screen may be, for example, an address book stored in the memory 44. E-mail addresses can be registered into the address book.

In Step S29, the control unit 45 transmits e-mail.

In Step S30, the control unit 45 causes the fourth key (fingertip key 16) to which a telephone number is registered to blink. In the present embodiment, a telephone number is registered to the first fingertip key 16a and the third fingertip key 16c, and thus the control unit 45 controls the light emitting units 17 disposed correspondingly to the first fingertip key 16a and the third fingertip key 16c to blink, respectively, thereby causing the first fingertip key 16a and the third fingertip key 16c to blink (or to be notified of). It should be noted that the control unit 45 may control the fingertip keys 16 to illuminate, instead of causing the fingertip keys 16 to blink.

In Step S31, the control unit 45 determines which key has been operated by the user. In other words, the control unit 45 determines whether a fingertip key 16 has been operated or a center key 15c has been operated. In a case in which the fingertip key 16 has been operated, the processing advances to Step S32. In a case in which the center key 15c has been operated, the processing advances to Step S37.

In Step S32, the control unit 45 determines whether the fingertip key 16 operated by the user is the first fingertip key 16a or the third fingertip key 16c blinking according to the processing in Step S30. In a case in which the operated key is not the first fingertip key 16a or the third fingertip key 16c (NO), the processing advances to Step S33. In a case in which the operated key is the first fingertip key 16a or the third fingertip key 16c (YES), the processing advances to Step S34.

In Step S33, the control unit 45 performs control such that the LCD display unit 21 displays an error display indicating that an e-mail address is not registered to the fingertip key 16 (the second fingertip key 16b) operated by the user.

In Step S34, the control unit 45 determines whether the created text includes a prohibited character, and determines whether the created text exceeds a predetermined amount of information (for example, 100 bytes). In a case in which the text includes a prohibited character, or in a case in which the text exceeds a predetermined amount of information (YES), the processing advances to Step S35. In a case in which the text does not include a prohibited character, and the text does not exceed a predetermined amount of information (NO), the processing advances to Step S41.

In Step S35, based on the response from the user, the control unit 45 determines whether the prohibited character included in the text is corrected, or whether the character string exceeding a predetermined amount of information is corrected. In a case in which the prohibited character is corrected, or in a case in which the text exceeding a predetermined amount of information is corrected (YES), the processing advances to Step S36. In a case in which the prohibited character is not corrected, or in a case in which the text exceeding a predetermined amount of information is not corrected (NO), the processing advances to Step S24.

In Step S36, the control unit 45 corrects all the prohibited characters included in the text. In other words, the control unit 45 substitutes all of the prohibited characters in the text with other appropriate characters, or deletes the excess character string.

In Step S37, the control unit 45 determines whether the created text includes a prohibited character, and determines whether the created text exceeds a predetermined amount of information (for example, 100 bytes). In a case in which the text includes a prohibited character, or in a case in which the text exceeds a predetermined amount of information (YES), the processing advances to Step S38. In a case in which the text does not include a prohibited character, and the text does not exceed a predetermined amount of information (NO), the processing advances to Step S40.

In Step S38, based on the response from the user, the control unit 45 determines whether the prohibited character included in the text is corrected, or whether the character string exceeding a predetermined amount of information is corrected. In a case in which the prohibited character is corrected, or in a case in which the text exceeding a predetermined amount of information is corrected (YES), the processing advances to Step S39. In a case in which the prohibited character is not corrected, or in a case in which the text exceeding a predetermined amount of information is not corrected (NO), the processing advances to Step S24.

In Step S39, the control unit 45 corrects all of the prohibited characters included in the text. In other words, the control unit 45 substitutes all of the prohibited characters in the text with other appropriate characters, or deletes the excess character string.

In Step S40, the control unit 45 performs control such that the destination selection screen is displayed on the LCD display unit 21 in order to cause the user to select a destination of the SMS mail. The destination selection screen may be, for example, an address book stored in the memory 44. Telephone numbers can be registered into the address book.

In Step S41, the control unit 45 transmits SMS mail.

In the cellular telephone device 50 operating in this way, a character string can be immediately created in the initial screen 100, and the created character string can be utilized in an application. Moreover, in the cellular telephone device 50, the created character string can be used as mail text, and mail can be transmitted in less steps. Furthermore, in the cellular telephone device 50, by causing a fingertip key 16 to blink, etc. (or to be notified of) (through light guidance), the operating procedures can be presented to the user in an easily understood manner.

EXPLANATION OF REFERENCE NUMERALS

1 cellular telephone device
11 operation unit (key operation unit)
21 LCD display unit (display unit)
44 memory
45 control unit
50 cellular telephone device
100 initial screen
101 first type character display area
102 second type character display area

The invention claimed is:

1. A portable electronic device, comprising:
a display unit;
a key operation unit; and
a control unit that performs control of the display unit and the key operation unit,
wherein the key operation unit is configured to include: first keys composed of a plurality of keys that are assigned with a first type character and a second type character; a second key to which the first type character and the second type character are not assigned, and to which a single or plurality of function(s) are assigned; and a third key to which the first type character and the second type character are not assigned, and to which a function different from the function of the second key is assigned,
wherein, in a case in which any one of the first keys is depressed in a state where an initial screen is displayed on the display unit, the control unit performs control such that two inputted characters are displayed on the display unit at the same time when depressing any one of the first keys at once, the two inputted characters being the first type character displayed in a first type character display area and the second type character assigned to same one of the first key displayed in a second type character display area, and wherein, in response to the second key being depressed while the first type character and the second type character are displayed on the display unit, the control unit selects inputted characters that are the first type character and performs first processing on the inputted characters selected, the first processing comprising converting the inputted first type characters to a different format; in response to the third key being subsequently operated to select a predetermined application, the control unit determines whether a character string created according to the first processing conforms to restrictions defined by the application; and in a case in which the character string is determined to not conform to the restrictions, the control unit performs second predetermined processing.

2. The portable electronic device according to claim 1, wherein, in a case in which the third key is operated to select the predetermined application in the first processing on the inputted characters selected, the control unit determines whether the character string created according to the first processing includes a prohibited character defined by the application, and in a case in which the character string is determined to include the prohibited character, the control unit converts the prohibited character into another character that fits the restrictions, as the second predetermined processing.

3. The portable electronic device according to claim 1, wherein, in a case in which the third key is operated to select the predetermined application in the first processing on the inputted characters selected, the control unit determines whether the character string created according to the first processing exceeds an amount of information defined by the application, and in a case in which the character string is determined to exceed the amount of information, the control unit deletes characters corresponding to an excess amount of information, as the second predetermined processing.

4. The portable electronic device according to claim 1, wherein the predetermined application is an application that identifies another party of a transmission by way of a telephone number, and transmits mail using a message with a predetermined number of character.

5. A portable electronic device, comprising:
a display unit;
a key operation unit; and
a control unit that performs control of the display unit and the key operation unit,
wherein the key operation unit is configured to include: first keys composed of a plurality of keys that are assigned with a first type character and a second type character; a second key to which the first type character and the second type character are not assigned, and to which a single or plurality of function(s) are assigned; and a third key to which the first type character and the second type character are not assigned, and to which a function different from the function of the second key is assigned,
wherein, in a case in which any one of the first keys is depressed in a state where an initial screen is displayed on the display unit, the control unit performs control such that two inputted characters are displayed on the display unit at the same time when depressing any one of the first keys at once, the two inputted characters being the first type character and the second type character assigned to same one of the first key, and the first type character is displayed in a first type character display area and the second type character is displayed in a second type character display area, wherein, in response to the second key being depressed while the first type character and the second type character are displayed on the display unit, the control unit selects inputted characters that are the first type character and performs predetermined processing on the inputted characters selected, the predetermined processing comprising converting the inputted first type characters to a different format, wherein, in response to the third key being subsequently operated to select a predetermined application, the control unit determines whether a character string created according to the predetermined processing conforms to restrictions defined by the application, wherein, in a case in which the character string is determined to not conform to the restrictions, the control unit determines whether the character string created according to the processing conforms to restrictions of an another application different from the application selected, and wherein, in a case in which the another application is determined to conform to restrictions, the control unit performs control such that selection of whether to select the another application in place of the predetermined application is allowed, or performs control such that the another application is activated.

6. The portable electronic device according to claim 5, wherein the predetermined application is an application that identifies another party of a transmission by way of a telephone number, and transmits mail using a message with a predetermined number of character.

7. A portable electronic device, comprising:
a display unit;
a key operation unit; and
a control unit that performs control of the display unit and the key operation unit,
wherein the key operation unit is configured to include: first keys composed of a plurality of keys that are assigned with a first type character and a second type character; a second key to which the first type character and the second type character are not assigned, and to which a single or plurality of function(s) are assigned; a third key to which the first type character and the second type character are not assigned, and to which a function different from the function of the second key is assigned; and a fourth key to which a telephone number can be registered,
wherein, in a case in which any one of the first keys is depressed in a state where an initial screen is displayed on the display unit, the control unit performs control such that two inputted characters are displayed on the display unit at the same time when depressing any one of the first keys at once, the two inputted characters being the first type character assigned to same one of the first key thus depressed and the second type character assigned to same one of the first key, and the first type character is displayed in a first type character display area and the second type character is displayed in a second type character display area, wherein, in response to the second key being depressed while the first type character and the second type character are displayed on the display unit, the control unit selects inputted characters that are the first type character and performs first processing on the inputted characters selected, the first processing comprising converting the inputted first type characters to a different format, and in a case in which the third key is subsequently operated to select an application that identifies another party of a transmission by way of a telephone number, and transmits mail with a message of a predetermined number of character, the control unit provides notification to identify the fourth key to which the telephone number is registered, and wherein, in a case in which the fourth key thus notified is operated, the control unit determines whether a character string created according to the first processing conforms to restrictions defined by the application; in a case in which the character string is determined to conform to the restrictions, mail is transmitted to a telephone number registered to the fourth key thus operated; and in a case in which the character string is determined to not conform to the restrictions, second predetermined processing is performed.

8. The portable electronic device according to claim 1, wherein the second predetermined processing is processing to adjust a character string to conform to the restrictions.

* * * * *